O. Stone.
Cultivator.
No. 78243. Fig. 1. Patented May 26, 1868.
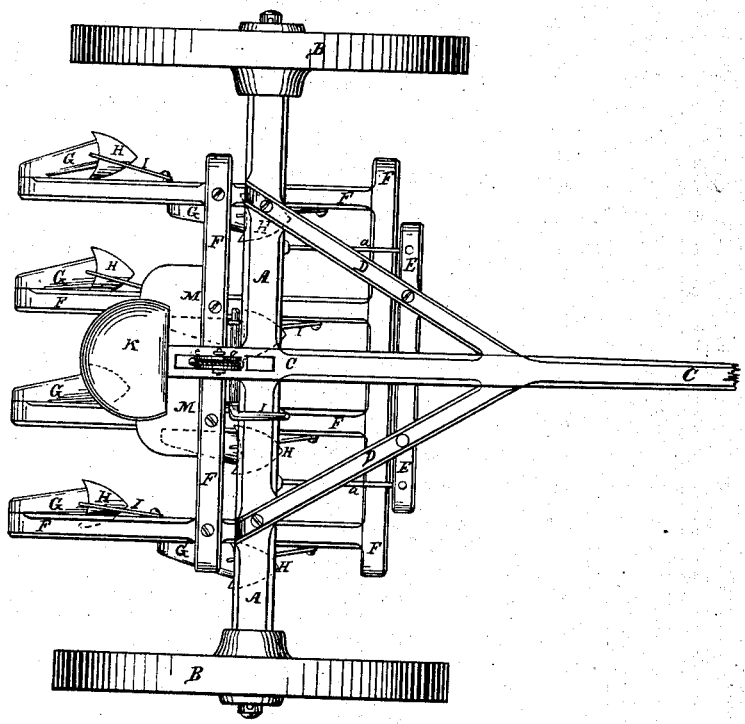
Fig. 2.
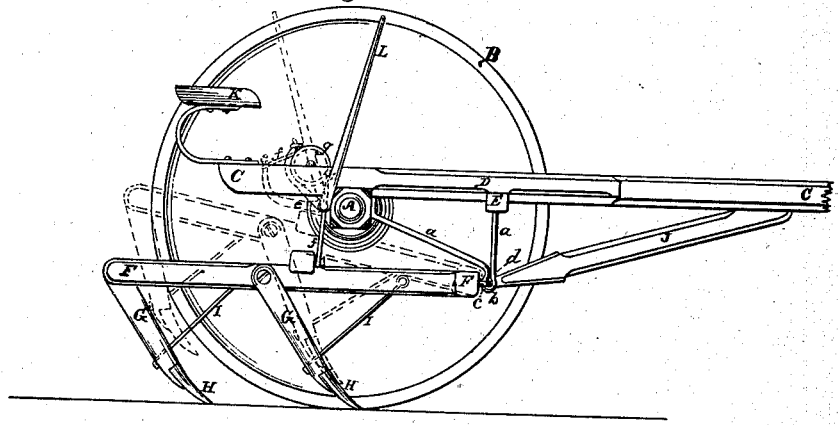
Witnesses:
Inventor,
Orrin Stone.
By atty A.B. Stoughton.

United States Patent Office.

ORRIN STONE, OF IONIA, MICHIGAN.

Letters Patent No. 78,243, dated May 26, 1868.

---

IMPROVEMENT IN CULTIVATORS.

---

The Schedule referred to in these Letters Patent and making part of the same.

---

TO ALL WHOM IT MAY CONCERN:

Be it known that I, ORRIN STONE, of Ionia, in the county of Ionia, and State of Michigan, have invented certain new and useful Improvements in Cultivators; and I do hereby declare the following to be a full, clear, and exact description of the same, reference being had to the accompanying drawings, making a part of this specification, in which—

Figure 1 represents a top plan, and

Figure 2 represents a side view, with the wheel removed to show the parts behind it.

Similar letters of reference, where they occur in the separate figures, denote like parts of the machine in both of the drawings.

My invention relates to a cultivator in which there are two frames, viz, an upper fixed frame, and an under hinged frame, the latter hinged to the former, so as to be raised and lowered thereon, so that the driver, from his seat, by a lever and other operating parts, may raise and lower the hinged frame that carries the cultivator-teeth or ploughs at pleasure, and so that the hinged frame shall be drawn or carried by the fixed frame.

To enable others skilled in the art to make and use my invention, I will proceed to describe the same with reference to the drawings.

A is an axle supported in two carrying-wheels B B. To this axle are secured the tongue C, the braces D D, and a cross-timber, E, which, being firmly united together, constitute the main or fixed frame.

Underneath the fixed frame there is a hinged or yielding frame, F, to which a series of standards, G, is attached, each standard having upon it one or more shoes, teeth, or ploughs, H, of such shape and form as may be found most efficient for the purpose of cultivating a crop, or ploughing furrows; said standards being braced against the resistance of the drag by rods I, or otherwise. The frame F is hinged to the fixed frame through the intervention of the rods or braces $a$ attached to the cross-timber E; thence extending downward to where a loop or dead-eye, $b$, is formed; and thence extending rearward and upward to the axle A, where it is fastened. And, though I have shown these brace-rods as made in one piece, they may be made in two pieces united at $b$, at which points the under frame is hinged by its loops or dead-eyes $c$. A tongue or guide-piece, J, is hinged, at $d$, to the under yielding frame, and the forward end of this guide-piece or secondary tongue is fastened to the main tongue C, to draw and guide the yielding frame by.

The driver's seat, K, is fastened on to the rear end of the tongue C, which projects beyond and in rear of the main axle, so that the weight of the driver, when in his seat, may aid to balance the machine.

To the axle A is hinged a lever, L, which extends upward, so as to be conveniently reached and operated by the driver in his seat. And on this lever L there is a bent or curved arm, $e$, to which one end of a cord or chain, $f$, is attached, which cord or chain, after passing over a pulley-wheel, $g$, in or on the tongue, extends down, and is fastened to the hinged frame F, by which contrivance the said hinged frame may be raised, held up, or let down by the driver at his pleasure. Upon the frame F there is a foot-board, M, for the feet of the driver, who may, by bracing upon the foot-board, hold the ploughs to the ground, or press them deeper therein, if required.

When the ploughs are raised up, the parts connected to them, and by which they are operated, will be in the position shown by the red lines in fig. 2.

Having thus fully described my invention, what I claim therein as new, and desire to secure by Letters Patent, is—

The combination of the fixed and the yielding frames, when united together by flexible connections, and the under or yielding one is made capable of being raised and carried by the fixed one, in the manner and for the purpose herein described and represented.

ORRIN STONE.

Witnesses:
C. O. THOMPSON,
A. B. FOX.